United States Patent
Yoshida et al.

(10) Patent No.: US 7,029,068 B2
(45) Date of Patent: Apr. 18, 2006

(54) CHILD SEAT

(75) Inventors: Ryoichi Yoshida, Echi-gun (JP); Junichi Yoshida, Hikone (JP); Koji Hiramatsu, Kanzaki-gun (JP)

(73) Assignee: Takata Corporation, Tokyo (JP)

( * ) Notice: Subject to any disclaimer, the term of this patent is extended or adjusted under 35 U.S.C. 154(b) by 129 days.

(21) Appl. No.: 10/681,139

(22) Filed: Oct. 9, 2003

(65) Prior Publication Data

US 2004/0075317 A1 Apr. 22, 2004

Related U.S. Application Data

(60) Provisional application No. 60/430,439, filed on Dec. 3, 2002.

(30) Foreign Application Priority Data

Oct. 11, 2002 (JP) .................... 2002-299201

(51) Int. Cl.
 *A47C 1/08* (2006.01)

(52) U.S. Cl. ................................. 297/250.1
(58) Field of Classification Search ............. 297/250.1, 297/254, 256.16, 463.1, 476, 474, 475, 468, 297/479, 256.17; 24/68 BT, 68 SB, 71 SB, 24/71.1, 68 CD; 74/10.85, 63, 422, 425, 74/507

See application file for complete search history.

(56) References Cited

U.S. PATENT DOCUMENTS

| | | | | |
|---|---|---|---|---|
| 4,679,852 A | * | 7/1987 | Anthony et al. ............. 297/464 |
| 4,858,997 A | * | 8/1989 | Shubin ........................ 297/487 |
| 4,886,315 A | * | 12/1989 | Johnson .................. 297/256.15 |
| 5,022,669 A | * | 6/1991 | Johnson ........................ 280/30 |
| 5,190,499 A | | 3/1993 | Mori et al. |
| 5,286,090 A | * | 2/1994 | Templin et al. ............. 297/473 |
| 5,303,979 A | * | 4/1994 | Koyanagi et al. ......... 297/250.1 |
| 5,524,965 A | * | 6/1996 | Barley .................... 297/256.16 |
| 5,605,375 A | * | 2/1997 | Friedrich et al. ......... 297/250.1 |
| 5,810,435 A | | 9/1998 | Surot |
| 5,839,789 A | * | 11/1998 | Koledin ...................... 297/476 |
| 6,047,451 A | | 4/2000 | Berger et al. |
| 6,081,976 A | * | 7/2000 | Nelsen ...................... 24/68 SB |
| 6,247,208 B1 | * | 6/2001 | Creech ...................... 24/68 BT |
| 6,390,562 B1 | * | 5/2002 | Takamizu et al. ........... 297/483 |
| 6,428,100 B1 | * | 8/2002 | Kain et al. .............. 297/256.16 |
| 6,672,663 B1 | * | 1/2004 | Kain ....................... 297/250.1 |
| 2001/0004163 A1 | | 6/2001 | Yamazaki |
| 2002/0033631 A1 | | 3/2002 | Ziv |
| 2002/0145318 A1 | * | 10/2002 | Asbach et al. ........... 297/250.1 |
| 2003/0127894 A1 | * | 7/2003 | McNeff ................... 297/250.1 |
| 2004/0108758 A1 | * | 6/2004 | Eastman et al. ......... 297/250.1 |

FOREIGN PATENT DOCUMENTS

| | | |
|---|---|---|
| EP | 0 328 311 A2 | 8/1989 |
| EP | 0 732 235 A2 | 9/1996 |
| EP | 1 069 009 A1 | 1/2001 |
| EP | 1 110 806 A1 | 6/2001 |
| FR | 2 627 443 | 8/1989 |
| JP | 10-059039 A | 3/1998 |
| JP | 2000-211471 A | 8/2000 |
| JP | 2001-114003 A | 4/2001 |

* cited by examiner

*Primary Examiner*—Milton Nelson, Jr.
(74) *Attorney, Agent, or Firm*—Foley & Lardner LLP

(57) ABSTRACT

A child seat for a vehicle which can be firmly secured to a vehicle seat even with a shoulder belt of a three-point seat belt and which can wind up the seat belt to securely apply a predetermined tension to the seat belt. The child seat includes a child seat and a shaft attached to the child seat. The shaft is rotatable about an axis of the shaft. Additionally, a first end of the shaft is disposed at a higher elevation than a second end of the shaft. The shaft further includes at least one slit configured to accept a seat belt.

20 Claims, 14 Drawing Sheets

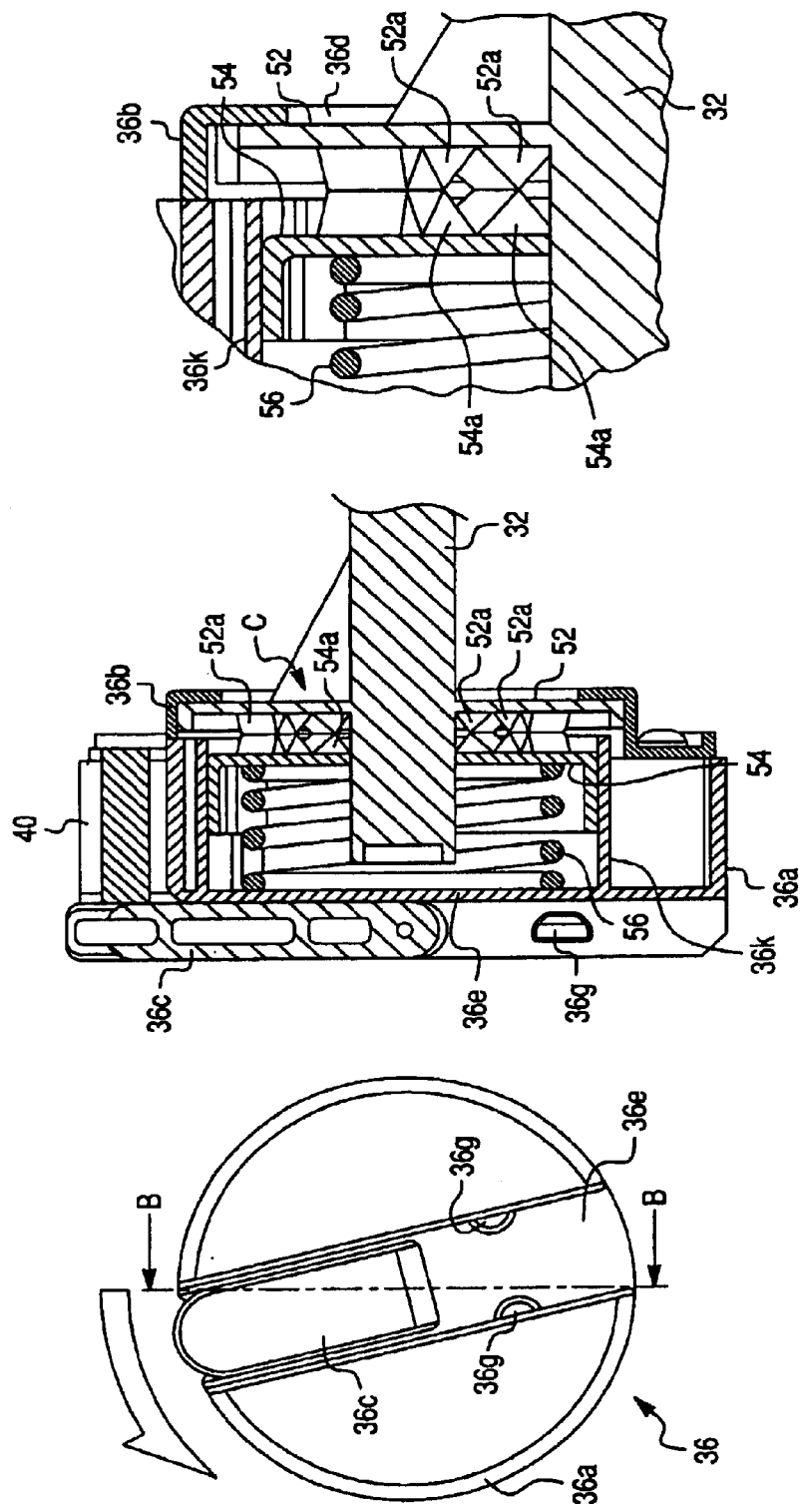

CHILD SEAT

BACKGROUND

The present invention relates to a child seat which is mounted and secured to a vehicle seat by a seat belt.

An example of this type of child seat has been disclosed in U.S. Pat. No. 5,839,789, herein incorporated by reference. FIG. 8 is a rear view of a child seat of U.S. Pat. No. 5,839,789, and FIG. 9 is a perspective view showing the structure for an adult seat belt winding mechanism at the bottom of the child seat.

The child seat 110 is mounted and secured to a vehicle seat (not shown) with an adult seat belt 100 (comprising a lap belt 100a and a shoulder belt 100b) of a vehicle and comprises a seat squab 112 on which a child is seated, a seat back 114, and a pair of dogleg-shaped side walls 116, 118 disposed on both sides of the combination of the seat squab 112 and the seat back 114. The dogleg-shaped side walls 116, 118 are provided with seat belt through apertures 120, 122, respectively, to allow the adult seat belt 100 to extend in the width direction of the child seat through these apertures 120, 122. The child seat 110 is also provided on the bottom thereof (the backside of the seat squab 112) with a wind-up reel 124 for winding the seat belt 100 extending between the seat belt through apertures 120 and 122 to tension the seat belt 100. The wind-up reel 124 has a slit 124a, for insertion of the seat belt, formed to penetrate the wind-up reel 124 in a diametrical direction. The slit 124a has a deep groove configuration extending in the axial direction of the wind-up reel 124 and exposed at one end of the axial direction.

The seat belt through apertures 120, 122 are formed in lower portions of the dogleg-shaped side walls 116, 118 to face each other such that the lap belt 100a composing the seat belt 100 extends substantially parallel to the top surface of the seat squab (not shown) of the vehicle seat when the lap belt 100a is threaded through one of the through apertures 120, 122 and is then threaded through the other.

The wind-up reel 124 is positioned halfway between the seat belt through apertures 120 and 122 such that the axial direction of the wind-up reel 124 is equal to the front-to-back direction of the child seat 110. The slit 124a is formed in the rear end of the wind-up reel 124. The rear end of the wind-up reel 124 is exposed at the seat back side of the child seat 110. In FIGS. 8 and 9, numeral 126 designates guide members for introducing the seat belt 100, inserted through the seat belt through apertures 120, 122, to the wind-up reel 124.

Integrally connected to the wind-up reel 124 is a torsion rod 128 which is disposed to extend along the bottom surface of the child seat 110 in the front-to-back direction. Secured to the front end of the torsion rod 128 is a worm wheel 130 which is meshed with a worm drive 134 described later.

A worm shaft 132 is disposed adjacent to the worm wheel 130 to extend in a width direction perpendicular to the axial direction of the torsion rod 128 and the wind-up reel 124. The worm drive 134 is fixed to the worm shaft 132 and is meshed with the worm wheel 130. The both ends of the worm shaft 132 penetrate the dogleg-shaped side walls 116, 118 so as to extend outside the child seat 110 through the right and left side walls 116, 118, respectively. The worm shaft 132 is provided at its both ends with knobs 136, 138 for operation of rotating the worm shaft 132 about its axis.

By the operation of rotating either of the knobs 136, 138, the wind-up reel 124 is rotated through the worm shaft 132, the worm drive 134, the worm wheel 130, and the torsion rod 128, whereby the seat belt 100 engaged in the slit 124a is wound around the wind-up reel 124. The worm gear composed of the worm wheel 130 and the worm drive 134 has a self-locking function. Therefore, even though the user looses his/her grip of the knob 136 or 138 after the seat belt 100 is wound around the wind-up reel 124, the wind-up reel 124 is stayed against the tension of the seat belt 100 by the self-locking function not to rotate in a direction opposite to the belt winding direction.

The child seat 110 is provided with clamps 140, 142 for clamping the seat belt 100 which are disposed on both lateral sides of the wind-up reel 124. Each clamp 140, 142 is adapted to allow the seat belt 100 to pass therethrough in a direction for winding up the seat belt 100 around the wind-up reel 124 and not to allow the seat belt 100 to pass therethrough in a direction opposite to the belt winding direction. Since the seat belt 100 is clamped by the clamps 140, 142, the seat belt 100 is prevented from being pulled out through the seat belt through apertures 120, 122 even when external force in a direction opposite to the belt winding direction is exerted to the seat belt 100.

A release lever 144 for releasing the clamping on the seat belt 100 by the clamps 140, 142 is provided at an upper portion of the seat back 114. The release lever 144 is interconnected to the clamps 140, 142 through a cable 146. As the release lever 144 is lifted, the respective clamps 140, 142 open to release the clamping on the seat belt 100. As the release lever 144 is depressed, the respective clamps 140, 142 close so that the seat belt 100 is clamped by the clamps 140, 142. In FIGS. 8 and 9, numeral 148 designates guide members for introducing the cable 146.

To secure the child seat 110 having the aforementioned structure to a vehicle seat, the release lever 144 is lifted into its open position to keep the clamps 140, 142 open. In this state, the seat belt 100 is threaded through one of the seat belt through apertures 120, 122 (in FIG. 8, the through aperture 122) and is threaded through the other through aperture 122 or 120 (in FIG. 8, the through aperture 120) so as to extend between the through apertures 120 and 122. Then, a tongue (not shown) is latched into a buckle (not shown).

The seat belt 100 extending between the through apertures 120 and 122 is inserted into the clamps 140, 142 and the halfway of the seat belt 100 is inserted into the slit 124a from the rear end of the wind-up reel 124. Then, the release lever 144 is depressed whereby the seat belt 100 is clamped by the clamps 140, 142.

After that, either of the knobs 136, 138 is turned to rotate the wind-up reel 124 so that the seat belt 100 is wound around the wind-up reel 124. Therefore, sufficient tension is applied to the seat belt 100, thereby firmly securing the child seat 110 to the vehicle seat.

When a three-point seat belt composed of a lap belt 100a and a shoulder belt 100b is used for securing the child seat 110 disclosed in U.S. Pat. No. 5,839,789, tension is applied to the shoulder belt 100b by winding up the shoulder belt 100b around the wind-up reel 124 so that the shoulder belt 100b tends to straighten between a deflection fitting and the tongue (both are not shown) to apply a raising force to the wind-up reel and the rear portion of the child seat 110 is thus biased upwardly.

Accordingly, there remains a need for a child seat which can be firmly secured to a vehicle seat even with a shoulder belt of a three-point seat belt.

In addition, in the child seat 110 disclosed in U.S. Pat. No. 5,839,789, it is difficult to recognize that sufficient tension has been really applied to the seat belt 100 by turning the knob 136, 138 to wind up the seat belt 100 around the wind-up reel 124.

Accordingly, there remains a need for a child seat which can wind up a seat belt to securely apply a predetermined tension to the seat belt.

SUMMARY OF THE INVENTION

According to an embodiment of the present invention, a child seat is provided which is mounted and secured to a vehicle seat by a seat belt designed primarily for use by an adult occupant (hereinafter, sometimes referred to as "adult seat belt"). More particularly, a child seat which is adapted to be firmly secured to a vehicle seat by winding an adult seat belt around a wind-up shaft to tension the adult seat belt is provided.

The child seat is adapted to be secured to a seat of a vehicle by a seat belt designed primarily for use by an adult occupant in the vehicle. The child seat includes a wind-up shaft, which has a slit into which the adult seat belt is inserted and which can rotate when the adult seat belt is inserted into the slit so as to wind up the adult seat belt thereby applying tension to the adult seat belt. The wind-up shaft extends in a vertical direction and includes a lap belt slit into which a lap belt of the adult seat belt can be inserted and a shoulder belt slit into which a shoulder belt of the adult seat belt can be inserted. The shoulder belt slit is located above the lap belt slit.

Since the wind-up shaft extends in a vertical direction and the shoulder belt slit is located above the lap belt slit, the shoulder belt extends substantially straight from a deflective fitting to a tongue when the shoulder belt is inserted in the shoulder belt slit and wound around the wind-up shaft. Therefore, the shoulder belt never applies a lifting force to the child seat, thereby stabilizing the attitude of the child seat.

According to another embodiment, it is preferable that the shoulder belt slit and the lap belt slit are disposed adjacent to each other and continue into each other via a common belt inlet.

In this embodiment, even when the lap belt is inserted into the shoulder belt slit for winding up the lap belt, the lap belt moves into the lap belt slit because of the tension applied to the lap belt. Similarly, even when the shoulder belt is inserted into the lap belt slit for winding up the shoulder belt, the shoulder belt moves into the shoulder belt slit because of the tension applied to the shoulder belt.

According to another embodiment, a child seat is adapted to be secured to a seat of a vehicle by a seat belt designed primarily for use by an adult occupant in the vehicle. The child seat includes a wind-up shaft, which has a slit into which the adult seat belt is inserted and which can rotate when the adult seat belt is inserted into the slit so as to wind up the adult seat belt, thereby applying tension to the adult seat belt. The child seat further includes a winding torque limiting means for preventing winding torque exceeding a predetermined value from being exerted on the wind-up shaft.

In this embodiment, the seat belt can be wound up to securely apply a predetermined tension to the seat belt. In addition, excessive winding torque is prevented from being exerted on the wind-up shaft.

According to another embodiment, the child seat preferably includes a knob for rotating the wind-up shaft. It is preferable that the winding torque limiting means forces the knob to idle when a torque exceeding the predetermined value is applied. According to this embodiment, the operator can recognize from the idling of the knob that the seat belt has been wound sufficiently.

It is to be understood that both the foregoing general description and the following detailed description are exemplary and explanatory only and are not restrictive of the invention claimed.

BRIEF DESCRIPTION OF THE DRAWINGS

These and other features, aspects, and advantages of the present invention will become apparent from the following description, appended claims, and the accompanying exemplary embodiments shown in the drawings, which are described briefly below.

FIG. 14(*b*) is a sectional view of the knob in FIG. 14(*a*) taken along the line B—B.

FIG. 14(*c*) is an enlarged view of portion C in FIG. 14(*b*).

FIG. 15(*a*) is a plan view of a knob according to the present invention showing operation of a torque clutch when the torque applied to the knob exceeds a predetermined value.

FIG. 15(*b*) is a sectional view of the knob of FIG. 15(*a*) taken along the line B—B.

FIG. 15(*c*) is an enlarged view of portion C in FIG. 15(*b*).

DETAILED DESCRIPTION

Figure 1:
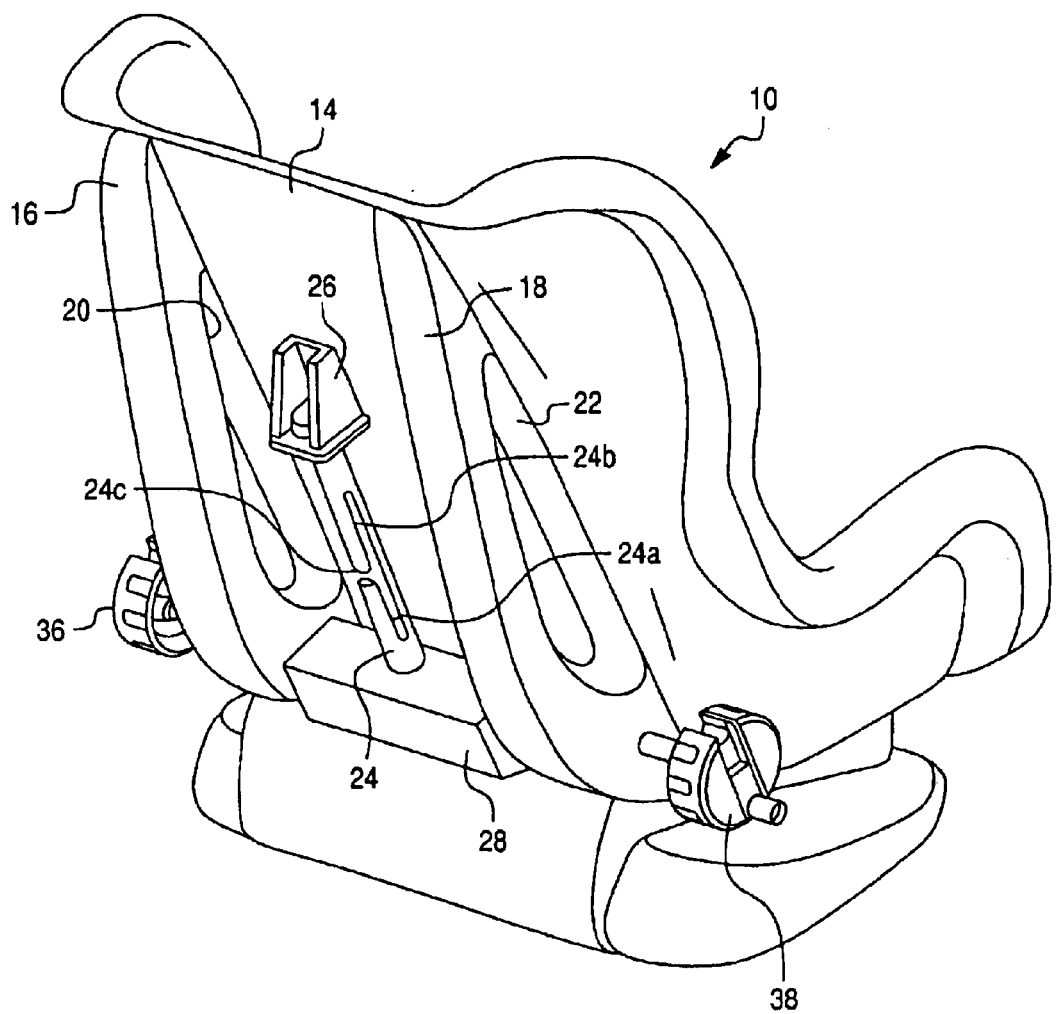
FIG. 1 is a rear perspective view of a child seat according to an embodiment of the present invention.
Figure 2:
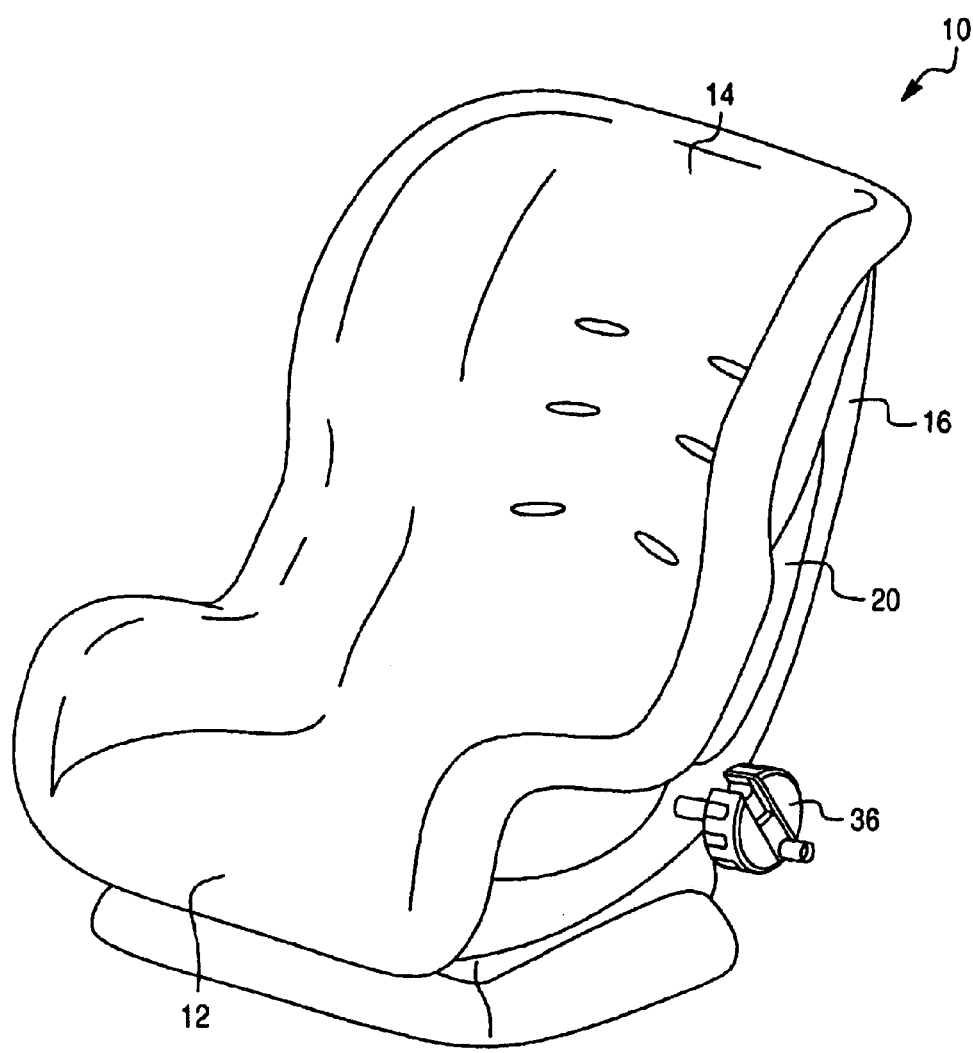
FIG. 2 is a front perspective view of the child seat in FIG. 1.

Embodiments of the present invention will be described below with reference to the accompanying drawings.

As shown in FIGS. 1–7, a child seat 10 is adapted to be mounted and secured to a vehicle seat (not shown) with an adult seat belt 1 (comprising a lap belt 1a and a shoulder belt 1b) of a vehicle.

The seat belt 1 is a well known seat belt of which a proximal end portion is connected to a retractor such that the seat belt can be wound up by the retractor; a distal end portion is connected to a vehicle body via a lap anchor; and a midway portion passes through a deflection fitting. The seat belt 1 passes through a belt through aperture of a tongue (not shown). A portion of the seat belt between the tongue and the deflection fitting is defined as the shoulder belt 1b and a portion of the seat belt between the tongue and the lap anchor is defined as the lap belt 1a. As well known in the art, in the state that the tongue is latched into the buckle, the shoulder belt 1b extends obliquely from the tongue to the deflection fitting across the seat back. The lap belt 1a extends substantially horizontally from the tongue to the lap anchor across a corner between the seat squab and the seat back.

The child seat 10 comprises a seat squab 12 on which a child is seated; a backrest portion 14; a pair of ribs 16, 18 projecting rearwards from both side edges of the back face of the backrest portion 14; adult seat belt through apertures 20, 22 which are formed in the ribs 16, 18, respectively; and a wind-up shaft 24 for winding up the adult seat belt which is positioned halfway between the seat belt through apertures 20 and 22.

The wind-up shaft 24 extends vertically along the backrest portion 14. The wind-up shaft 24 has a lap belt slit 24a and a shoulder belt slit 24b into which the lap belt 1a and the shoulder belt 1b of the adult seat belt are inserted, respectively. The shoulder belt slit 24b is located above the lap belt slit 24a. The lap belt slit 24a and the shoulder belt slit 24b are disposed adjacent to each other in a vertical direction and continue into each other via a common belt inlet 24c.

Figure 4:
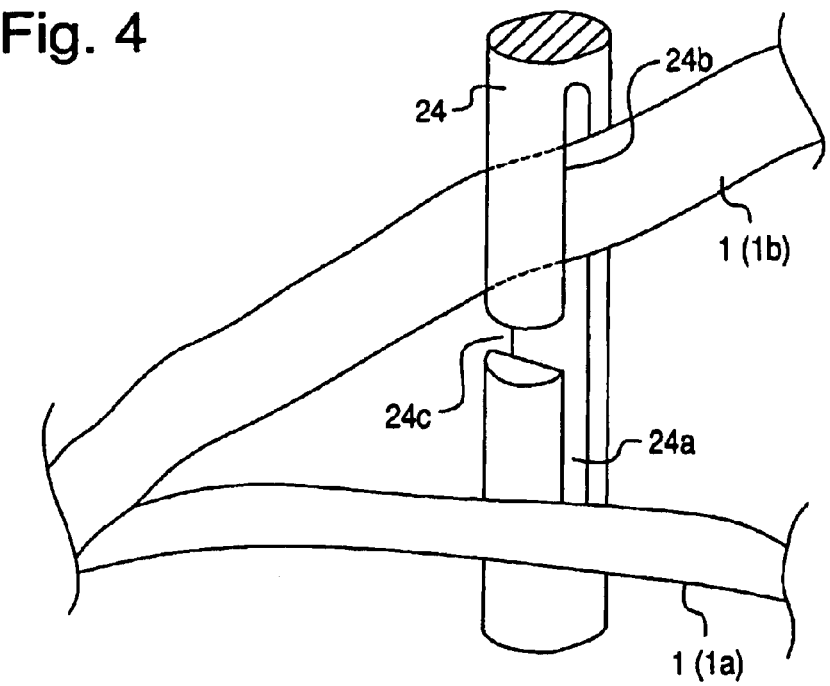
FIG. 4 is a partial perspective view showing a situation where a seat belt is engaged with a wind-up shaft according to an embodiment of the present invention.
Figure 5:
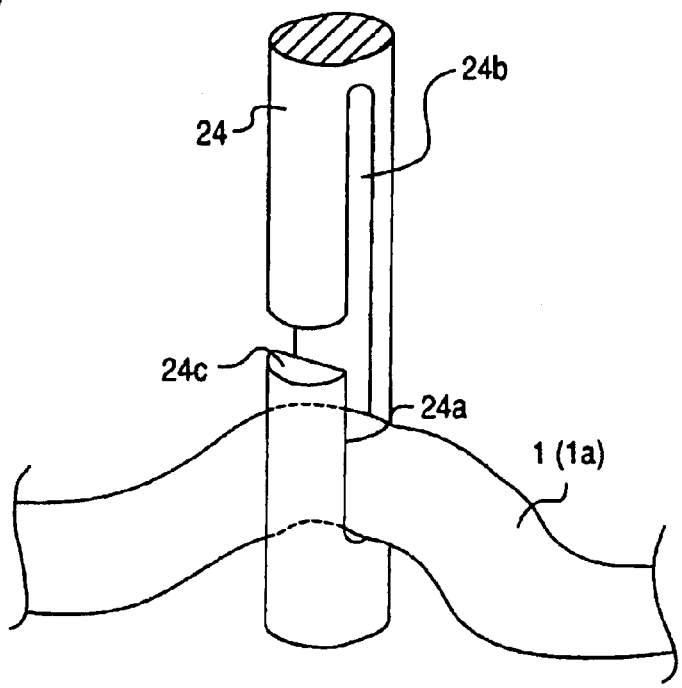
FIG. 5 is a partial perspective view showing a situation where a seat belt is engaged with a wind-up shaft according to an embodiment of the present invention.

As shown in FIGS. 4–5, the lap belt slit 24a and the shoulder belt slit 24b are formed to penetrate the wind-up shaft 24 in the diametrical direction and to extend in the axial direction (vertical direction) of the wind-up shaft 24. In this embodiment, the lap belt slit 24a and the shoulder belt slit 24b are formed linearly in the axial direction of the wind-up shaft 24. The belt inlet 24c is formed at a middle portion between the lap belt slit 24a and the shoulder belt slit 24b to cut a side peripheral surface of the middle portion of the wind-up shaft 24.

Figure 6:
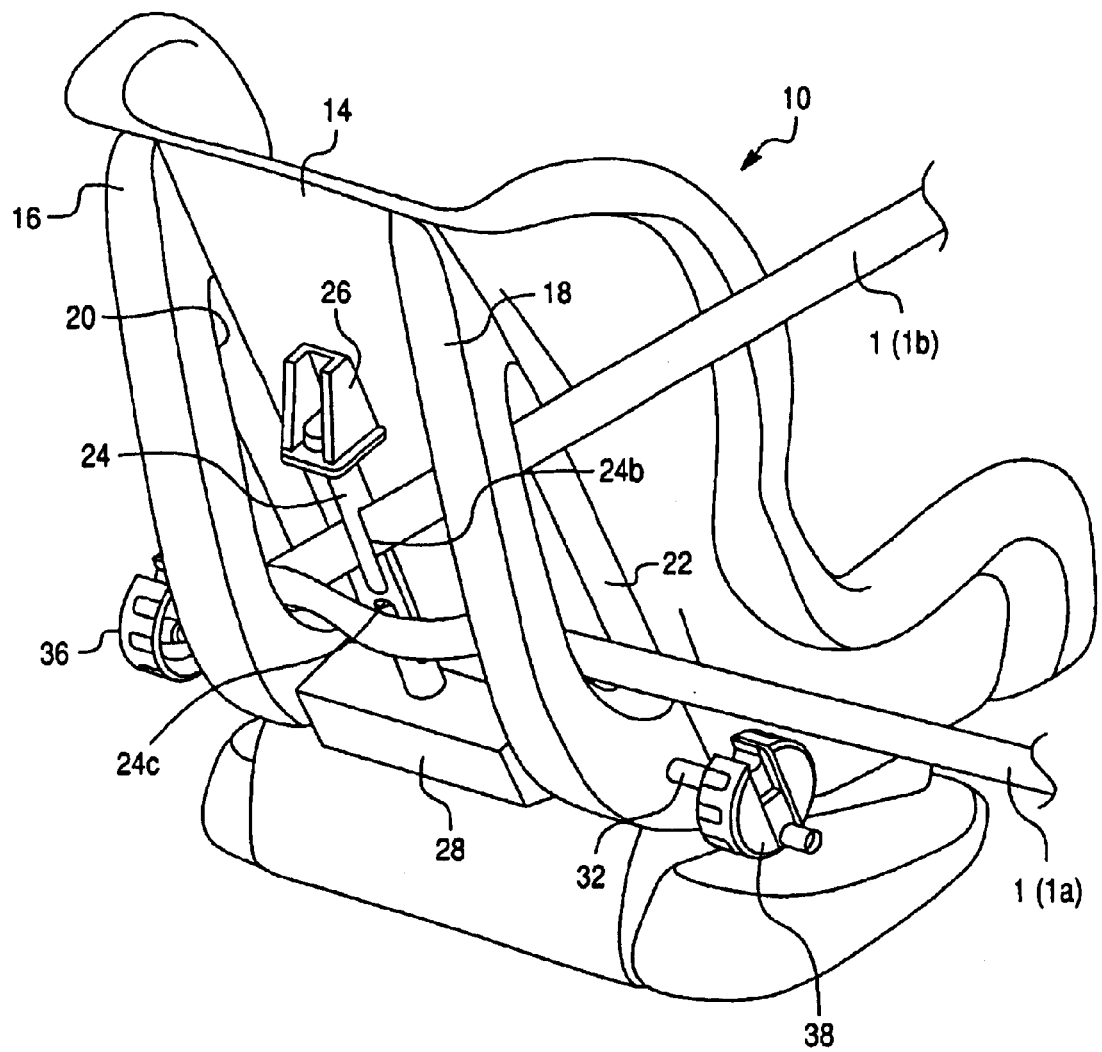
FIG. 6 is a rear perspective view of a child seat according to an embodiment of the present invention in which a seat belt is engaged with a wind-up shaft.
Figure 7:
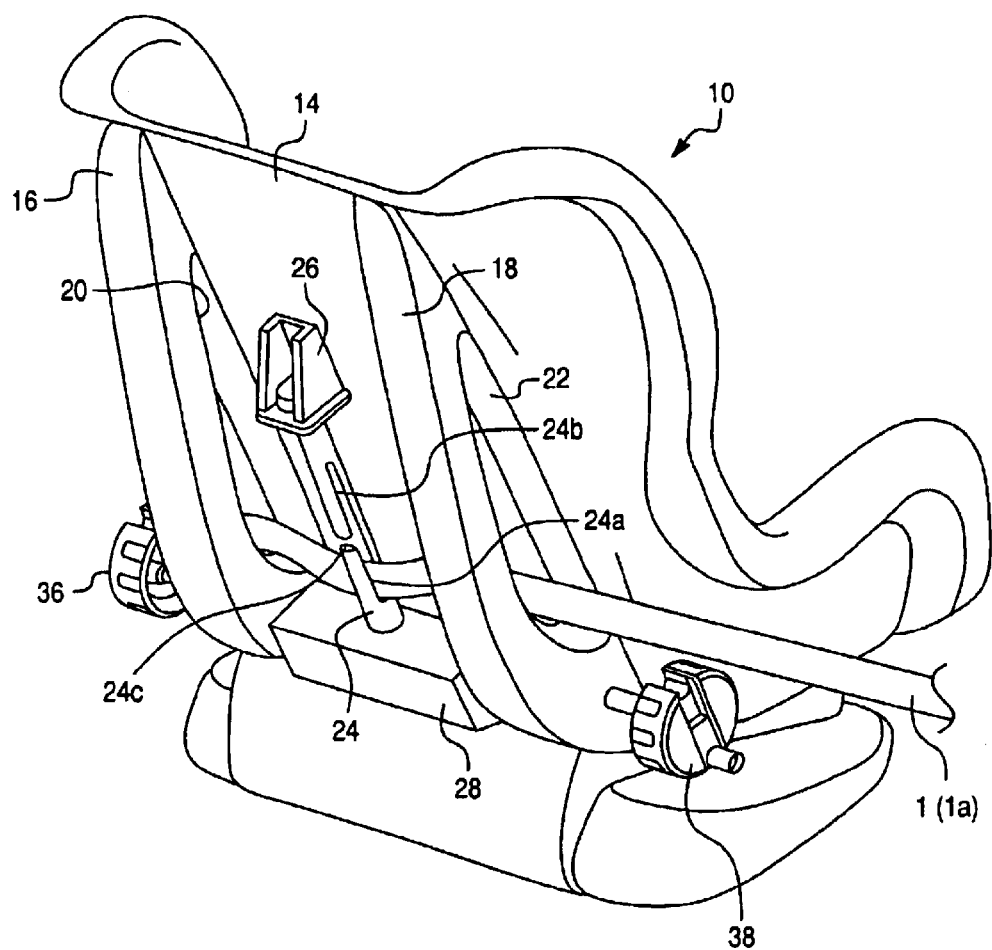
FIG. 7 is a rear perspective view of a child seat according to an embodiment of the present invention in which a seat belt is engaged with a wind-up shaft.
Figure 8:
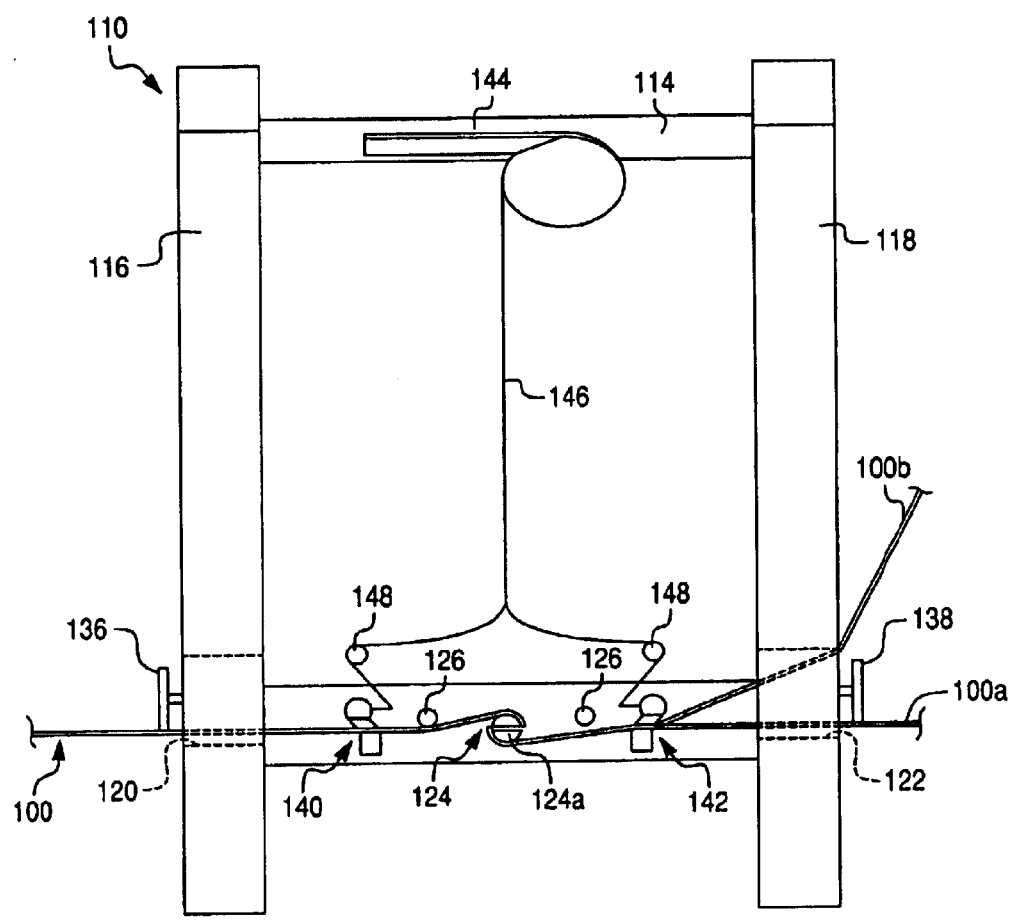
FIG. 8 is a rear view of a child seat of U.S. Pat. No. 5,839,789, as a conventional example.
Figure 9:
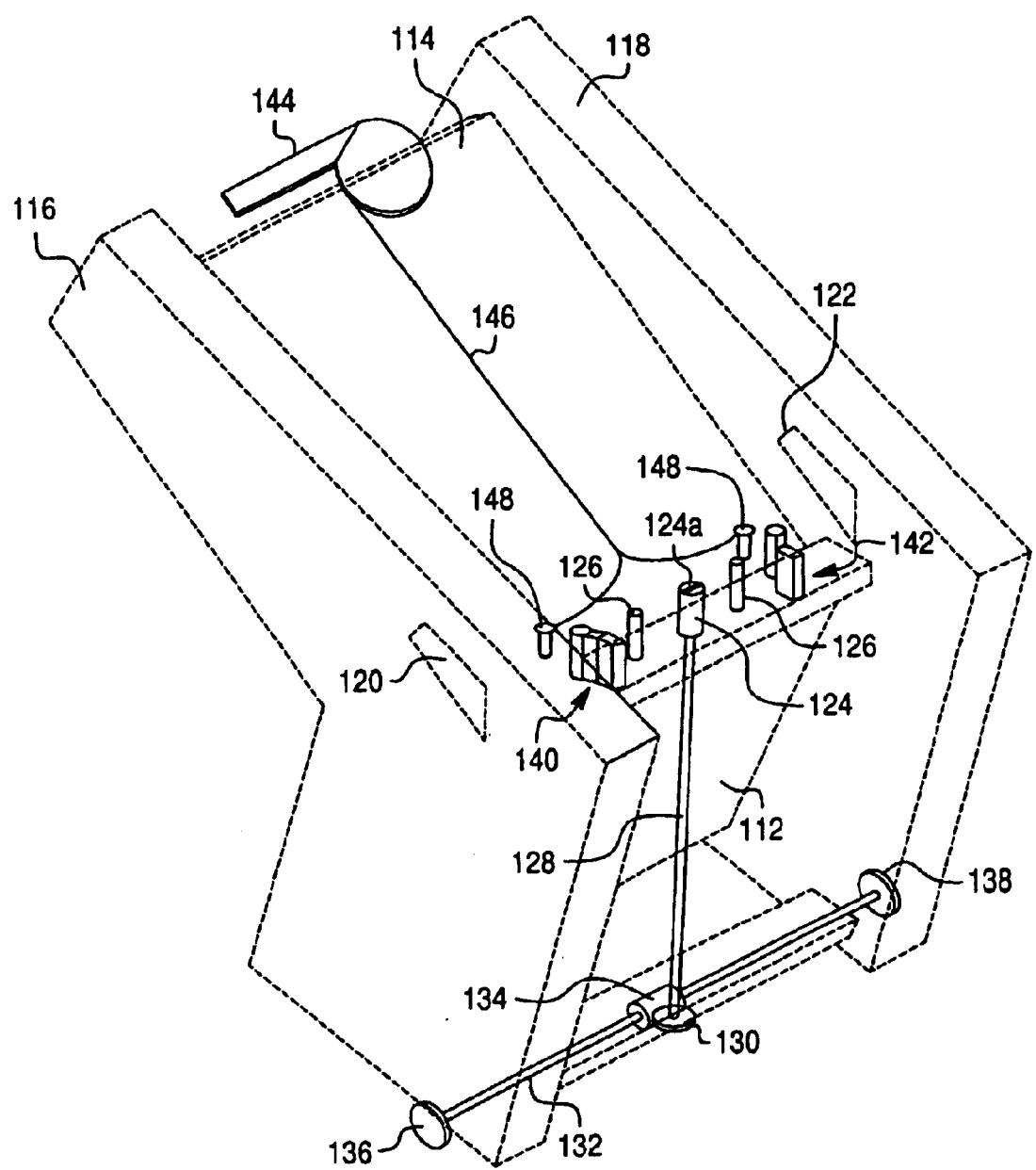
FIG. 9 is a perspective view of a conventional child seat showing the structure of a wind up shaft rotational mechanism at the bottom of the child seat.

The ribs 16, 18 extend vertically along the back face of the backrest portion 14. The seat belt through apertures 20, 22 are also formed to extend vertically along the backrest portion 14. The seat belt through apertures 20, 22 have such size and arrangement as to allow the lap belt 1a to extend substantially parallel to the upper surface of the seat squab of the vehicle and also allow the shoulder belt 1b to extend substantially straight from the deflection fitting to the tongue when the seat belt 1 is threaded through one of the seat belt through apertures 20, 22 and is then threaded through the other through aperture 20 or 22 and the tongue is latched into the buckle as shown in FIGS. 6–7.

The lap belt slit 24a is formed at such a level that the lap belt 1a can be inserted into the lap belt slit 24a while the lap belt 1a extends in parallel with the top surface of the seat squab of the vehicle between the seat belt through apertures 20 and 22. The shoulder belt slit 24b is formed at such a level that the shoulder belt 1b can be inserted into the shoulder belt slit 24b while the shoulder belt 1b threaded through the seat belt through apertures 20 and 22 extends substantially straight from the deflection fitting to the tongue.

The upper end of the wind-up shaft 24 is supported by a bracket 26 attached to the back face of the backrest portion 14 such a manner as to allow the rotation of the wind-up shaft 24 about its axis. The lower end of the wind-up shaft 24 is inserted into a mechanical box 28 arranged at a lower portion of the backrest portion 14. Within the mechanical box 28, a worm wheel 30 meshed with a worm drive 34 is fixed to the lower end of the wind-up shaft 24.

The mechanical box 28 is arranged between lower end portions of the left and right ribs 16 and 18. The both side faces of the mechanical box 28 are connected to the opposite faces of the ribs 16, 18, respectively. Through holes (not shown) are formed in the both side faces of the mechanical box 28 and the ribs 16, 18, respectively, so that a worm shaft 32 described later can pass through these through holes.

Figure 3:
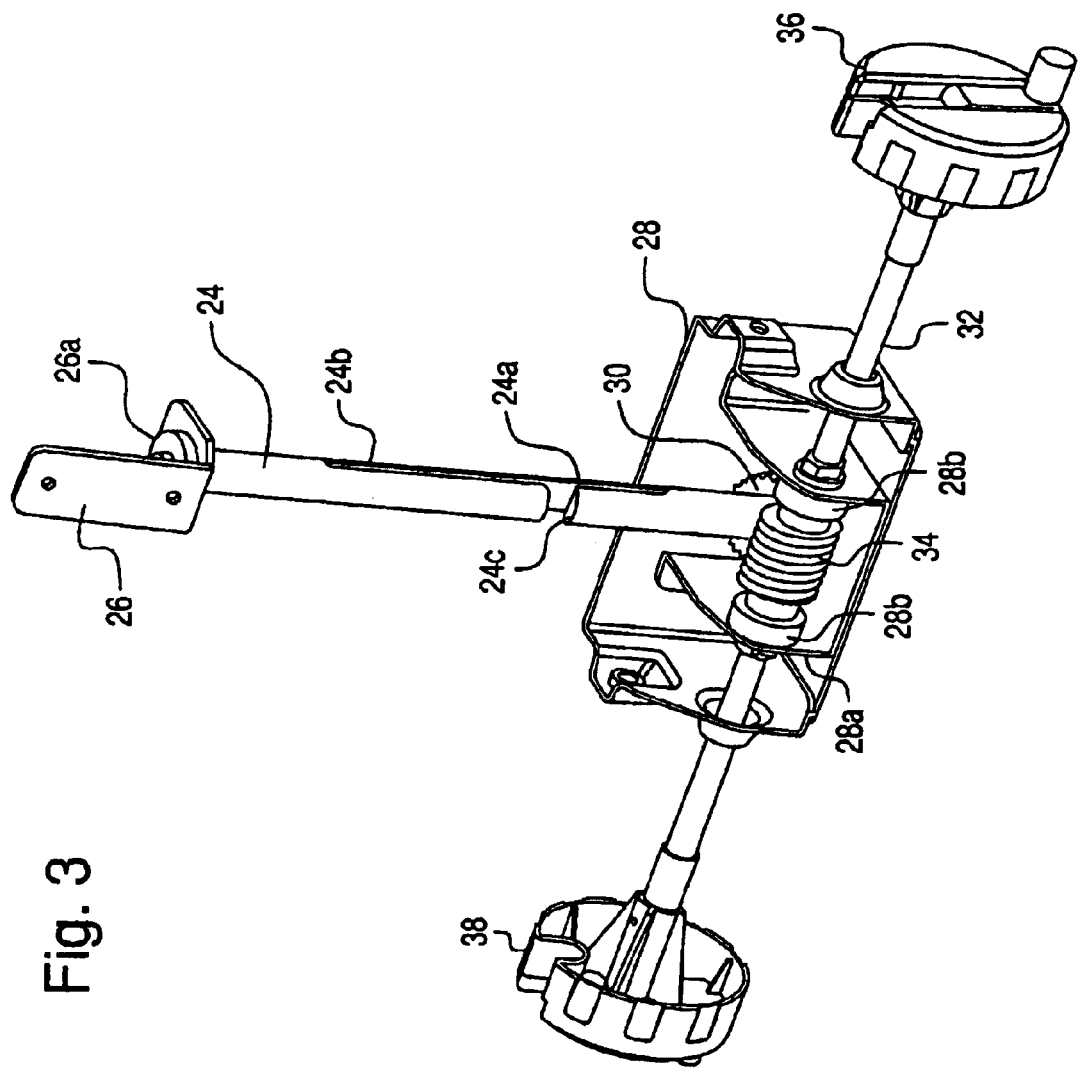
FIG. 3 is a perspective view showing a rotational mechanism for rotating a wind-up shaft according to an embodiment of the present invention.

As shown in FIG. 3, within the mechanical box 28, the worm shaft 32 is arranged adjacent to the lower end (worm wheel 30) of the wind-up shaft 24 to extend in the width direction perpendicular to the extending direction of the wind-up shaft 24. The worm drive 34 is fixed to the worm shaft 32 and is meshed with the worm wheel 30. The both ends of the worm shaft 32 penetrate the both side faces of the mechanical box 28 and the left and right ribs 16, 18 so as to extend outside the child seat 10, respectively. The worm shaft 32 is provided at its both ends with knobs 36, 38 for rotating the worm shaft 32 about its axis. The knobs 36, 38 are provided with finger grips 40 (see FIGS. 10–11 described later) for facilitating the operation of the knobs 36, 38.

In FIG. 3, numeral 26a designates a bearing to which the upper end of the wind-up shaft 24 is rotatably fitted. Numeral 28a designates a bracket holding the worm shaft 32, and numeral 28b designates bearings attached to the bracket 28a for rotatably supporting the worm shaft 32.

By the operation of rotating either of the knobs 36, 38, the wind-up shaft 24 is rotated through the worm shaft 32, the worm drive 34, and the worm wheel 30, whereby the lap belt 1a inserted in the lap belt slit 24a or the shoulder belt 1b inserted in the shoulder belt slit 24b is wound around the wind-up shaft 24. The worm gear composed of the worm wheel 30 and the worm drive 34 has a self-locking function. Therefore, even though the user looses his grip of the knob 36 or 38 after the lap belt 1a or the shoulder belt 1b is wound around the wind-up shaft 24, the wind-up shaft 24 is stayed against the tension of the belt 1a, 1b by the self-locking function so as not to rotate in a direction opposite to the belt winding direction, thereby preventing slack from developing in seat belt 1 after the lap belt 1a or the shoulder belt 1b is wound up.

In this embodiment, each knob 36, 38 is connected to the worm shaft 32 via a torque clutch 50 with torque limiter for limiting the winding torque. The torque clutch 50 is designed to force the knob 36, 38 to idle when the knob 36, 38 is rotated in the belt winding direction after the lap belt 1a or the shoulder belt 1b is sufficiently wound around the wind-up shaft 24 and the preset tension has been exerted on the belt 1a, 1b, thereby preventing winding torque from being further applied to the wind-up shaft 24.

The structures of the knob 36, 38 and the torque clutch 50 will now be described with reference to FIGS. 10–15(c).

The knob 36 comprises a knob casing 36a having a substantial cylindrical container of which the back side is an open end face; a cover 36b attached to the open end face of the knob casing 36a; and an arm 36c for supporting the finger grip 40, which is disposed on a front end face of the knob casing 36a. The torque clutch 50 is accommodated within the knob casing 36a. The worm shaft 32 is inserted into the knob casing 36a through an aperture 36d of the cover 36b.

The knob casing 36a has a groove 36e formed in the front end face thereof such that the arm 36c can be fitted in the groove 36a in the diametrical direction of the knob casing 36a when the longitudinal direction of the arm 36c is equal to the diametrical direction of the knob casing 36a. One end of the groove 36e is exposed to a grip accommodating space 36f which is formed by cutting a portion of the periphery of the knob casing 36a.

Figure 10:
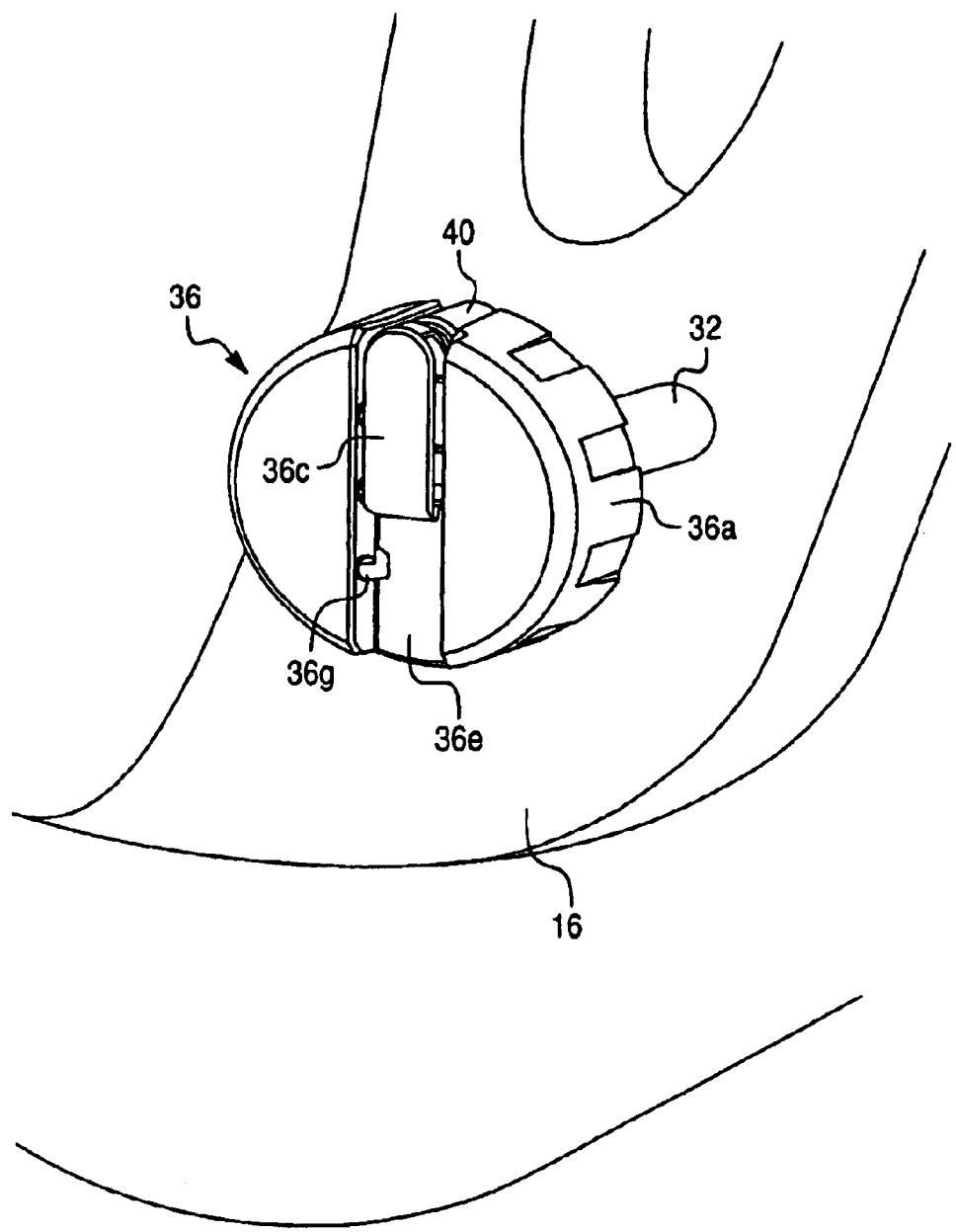
FIG. 10 is a perspective view of a knob according to an embodiment of the present invention in which the knob accommodates a finger grip.
Figure 11:
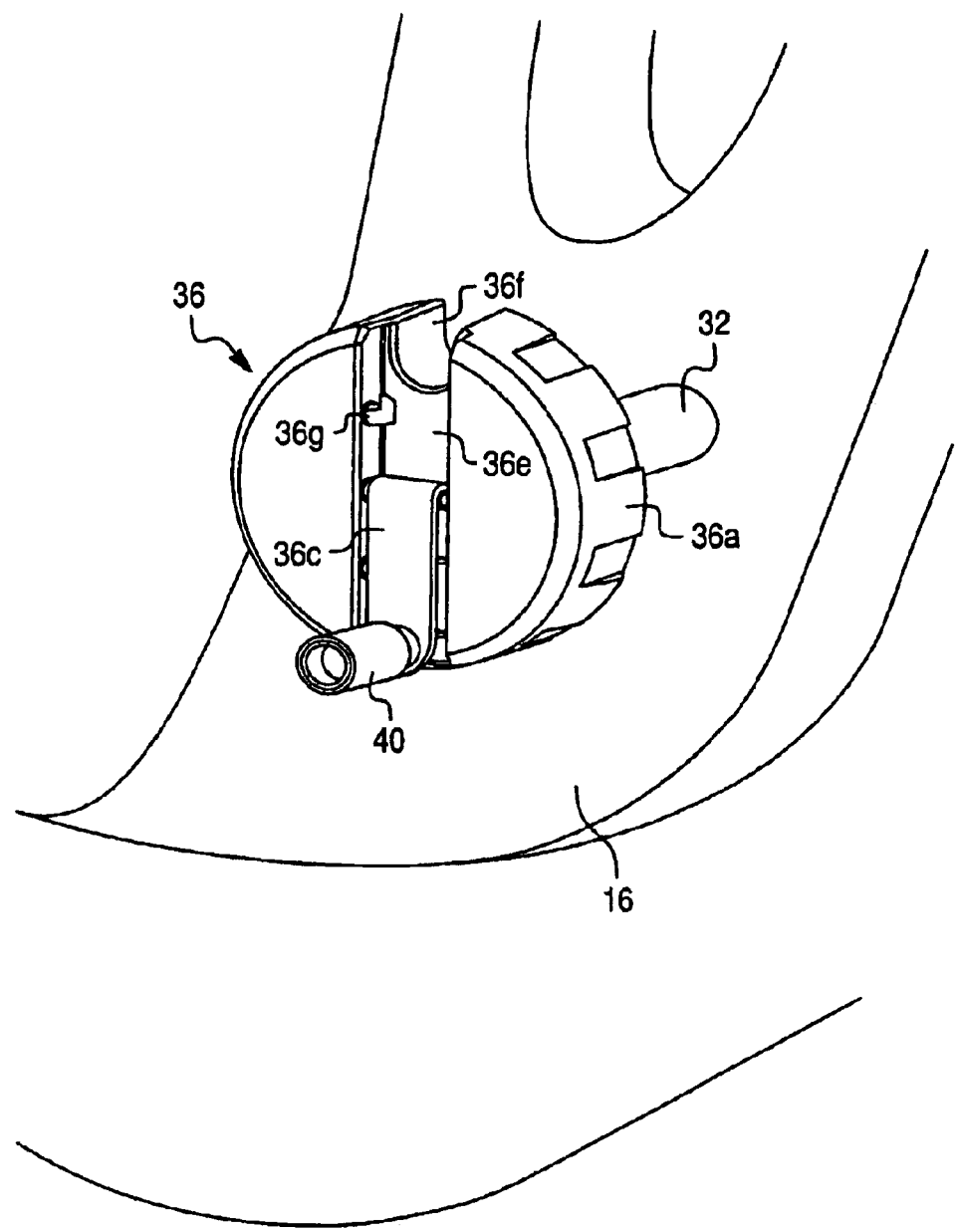
FIG. 11 is a perspective view of the knob of FIG. 10 where the finger grip is in use.

The arm 36c has a length substantially equal to the radius of the end face of the knob casing 36a. An end (proximal end) of the arm 36c is pivotally supported within the groove 36e at about the center of the end face of the knob casing 36a. As shown in FIGS. 10–11, the arm 36c is pivotable about its proximal end so that the arm 36c can be selectively fitted in either of halves of the groove 36e. The finger grip 40 is rotatably attached to the other end (distal end) of the arm 36c such that the finger grip 40 is accommodated in the grip accommodating space 36f when the distal end of the arm 36c is fitted in the groove 36e to face the grip accommodating space 36f.

Figure 12:
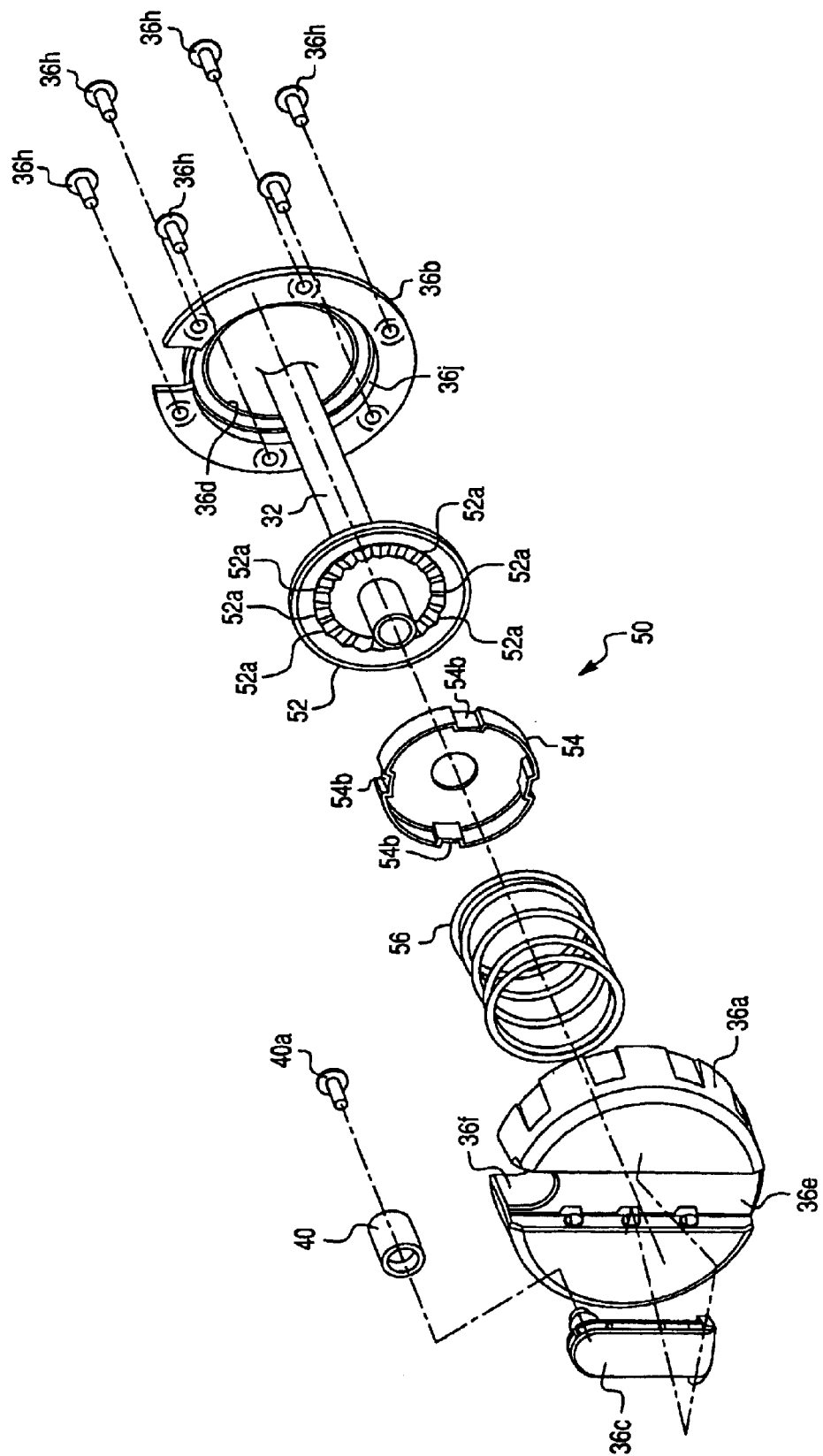
FIG. 12 is an exploded front perspective view of the knob of FIG. 10 showing the knob and torque clutch.
Figure 13:
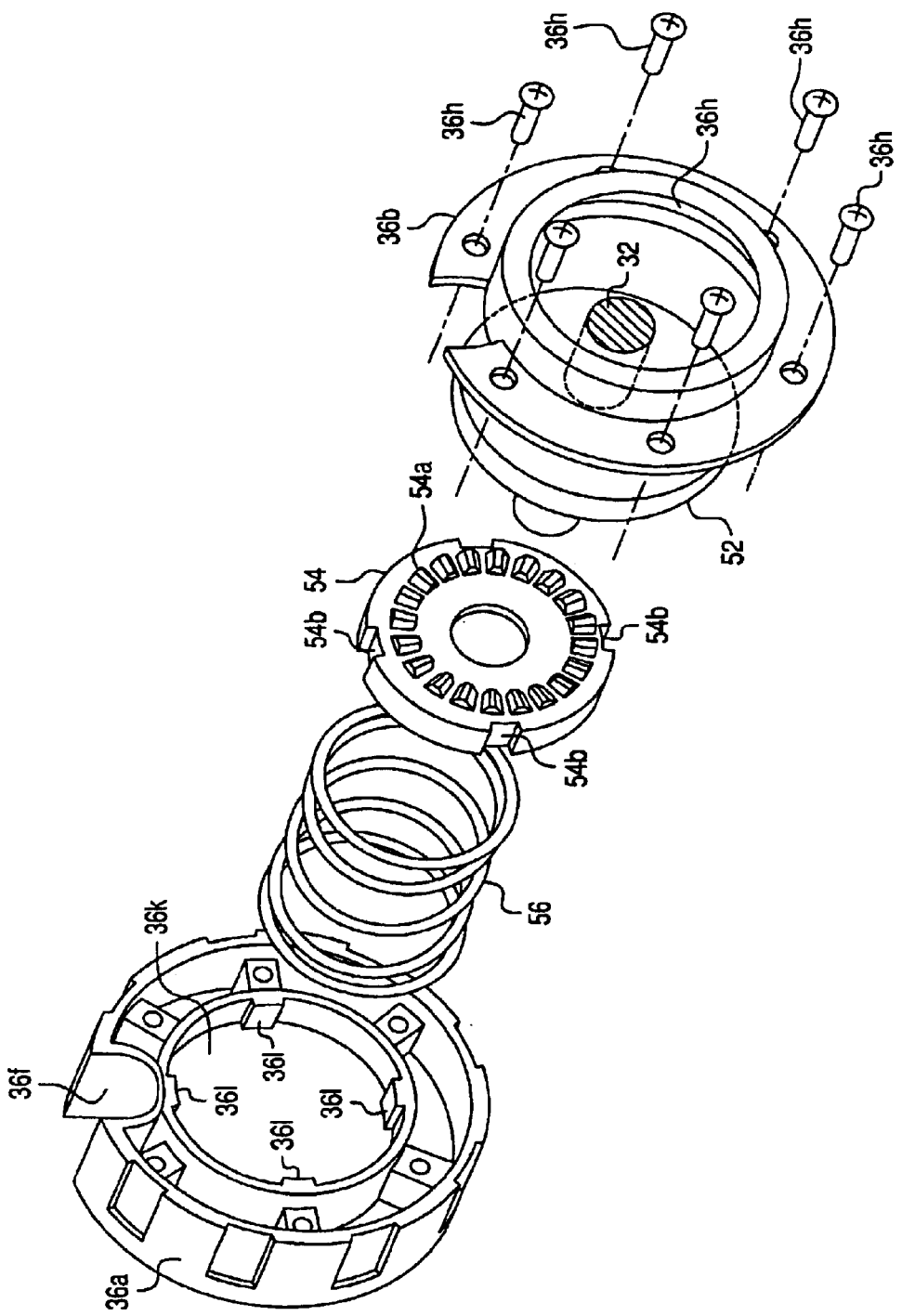
FIG. 13 is an exploded rear perspective view of the knob of FIG. 10 showing the knob and torque clutch.

In FIGS. 10–11, numeral 36g designates pairs for retaining members for retaining the arm 36c in the groove 36e in a state that the finger grip 40 is accommodated in the accommodating space 36f and in a state that the finger grip 40 is taken out from the accommodating space 36f and is in usable condition. In FIG. 12, numeral 40a designates a bolt for rotatably attaching the finger grip 40 to the arm 36c and numeral 36h designates vises for fixing the cover 36b to the knob casing 36a.

The torque clutch 50 comprises a first clutch disc 52 fixed at the end of the worm shaft 32, a second clutch disc 54 disposed facing the first clutch disc 52, and a clutch spring 56 for pressing the second clutch disc 54 against the first clutch disc 52. The first clutch disc 52 and the second clutch disc 54 have serrations 52a, 54a, composed of triangle convexities and engageable with each other, on the respective opposed surfaces thereof. The serrations 52a, 54a are arranged on the surfaces of the clutch discs 52, 54 to form circles having the same radius coaxially with the worm shaft 32.

The first clutch disc 52 is held in a first clutch disc holding space 36j formed in the interior side surface of the cover 36b. The second clutch disc 54 is held in a second clutch disc holding space 36k formed in the knob casing 36a.

The second clutch disc holding space 36k is provided with projections 36I for guiding the second clutch disc 54 in a direction closer to and apart from the first clutch disc 52 and for coupling the second clutch disc 54 and the knob casing 36a to rotate together. The projections 36I are slidably engaged with guide grooves 54b formed in the periphery of the second clutch disc 54.

The clutch spring 56 is compressed and disposed between the second clutch disc 54 and the bottom surface of the second clutch disc holding space 36k. As the knob casing 36a is rotated, the second clutch disc 54 is rotated together. Though the serrations 54a of the second clutch disc 54 tend to cross over the serrations 52a of the first clutch disc 52 so that the second clutch disc 54 tends to come off the first clutch disc 52, the clutch spring 56 has such a biasing force (spring constant) as to press the second clutch disc 54 not to come off the first clutch disc 52 so as to prevent the serration 54a from crossing over the serrations 52a until rotational torque exceeding a preset value (for example, 10 kgf-cm) is applied to the knob 36.

Figure 14A:
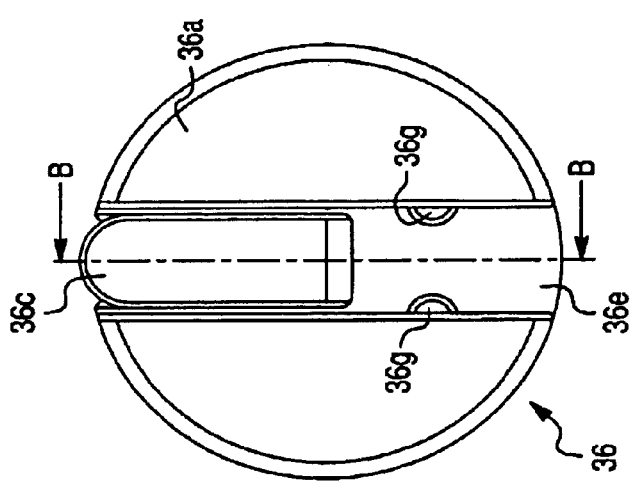
FIG. 14(*a*) is a plan view of a knob according to an embodiment of the present invention showing operation of a torque clutch when the torque applied to the knob is equal to a predetermined value or less.
Figure 14B:
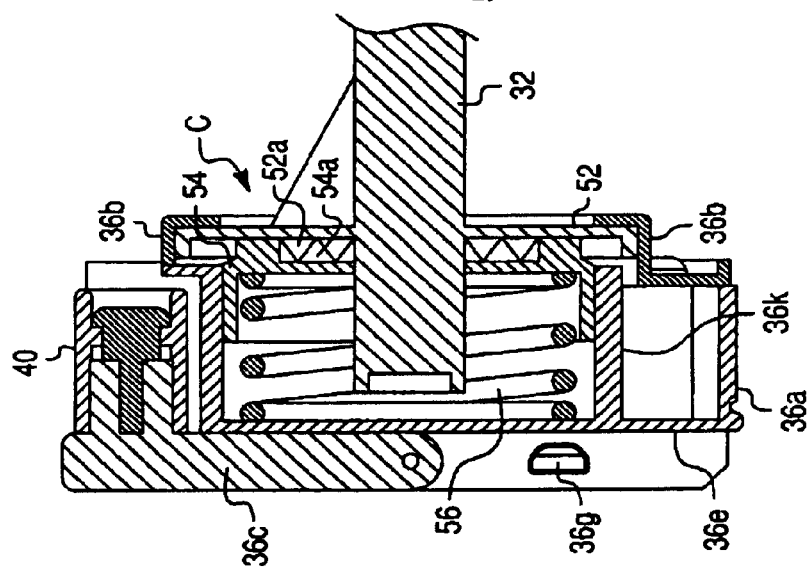
Figure 14C:
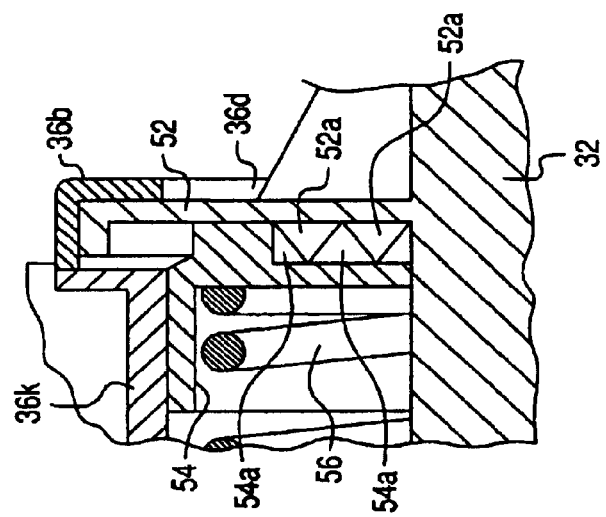

In the torque clutch 50 having the aforementioned structure, when the rotational torque applied to the knob 36 is equal to the preset value or less, the serrations 54a do not cross over the serrations 52a so as to keep the engagement between the first clutch disc 52 and the second clutch disc 54 because of the biasing force of the clutch spring as shown in FIGS. 14(b)–14(c). Therefore, the first clutch disc 52 and the second clutch disc 54 are rotated together so that the rotational torque applied to the knob 36 is transmitted to the worm shaft 32, whereby the worm shaft 32 is rotated.

When the rotational torque applied to the knob 36 exceeds the preset value, the second clutch disc 54 comes off the first clutch disc 52 while the serrations 54a cross over the serrations 52a against the biasing force of the clutch spring 56 as shown in FIGS. 15(b)–15(c). Therefore, the knob 36 idles so as to prevent the rotational torque applied to the knob 36 from being transmitted to the worm shaft 32.

The steps of installing the child seat 10 according to an embodiment of the present invention to a vehicle seat will now be described.

In case using an adult seat belt 1 composed of only a lap belt 1a, i.e., a so-called two-point seat belt, the child seat 10 is put on the vehicle seat. After that, the lap belt 1a is threaded through one of the seat belt through apertures 20, 22 (in FIG. 7, the through aperture 22) and is threaded through the other through aperture 22 or 20 (in FIG. 7, the through aperture 20) so as to extend between the through apertures 20 and 22 as shown in FIG. 7. A tongue connected to the end of the lap belt 1a is then latched into a buckle. After that, the halfway of the lap belt 1b extending between the through apertures 20 and 22 is inserted into the lap belt slit 24a through the belt inlet 24c.

After that, either of the knobs 36, 38 is turned to rotate the wind-up shaft 24 so that the lap belt 1a is wound around the wind-up shaft 24 until sufficient tension is applied to the lap belt 1a, thereby firmly securing the child seat 10 to the vehicle seat with the lap belt 1a.

In case using an adult seat belt 1 composed of a lap belt 1a and a shoulder belt 1b, i.e., a so-called three-point seat belt, the child seat 10 is put on the vehicle seat. After that, the lap belt 1a and the shoulder belt 1b are threaded through one of the seat belt through apertures 20, 22 (in FIG. 6, the through aperture 22) and are threaded through the other through aperture 22 or 20 (in FIG. 6, the through aperture 20) so as to extend between the through apertures 20 and 22 as shown in FIG. 6. A tongue is then latched into a buckle. After that, the halfway of the shoulder belt 1b extending between the through apertures 20 and 22 is inserted into the shoulder belt slit 24b. In this case, the lap belt 1a is not inserted into the lap belt slit 24a.

After that, either of the knobs 36, 38 is turned to rotate the wind-up shaft 24 so that the shoulder belt 1b is wound around the wind-up shaft 24 until sufficient tension is applied to the lap belt 1a and the shoulder belt 1b, thereby firmly securing the child seat 10 to the vehicle seat with the lap belt 1a and the shoulder belt 1b.

In the child seat 10 in this embodiment, the wind-up shaft 24 extends in a vertical direction and is provided with the lap belt slit 24a at such a level that the lap belt 1a can be inserted into the lap belt slit 24a while the lap belt 1a extends in substantially parallel with the seat squab of the vehicle between the seat belt through apertures 20 and 22 and further provided with the shoulder belt slit 24b at such a level that the shoulder belt 1b can be inserted into the shoulder belt slit 24b while the shoulder belt 1b threaded through the seat belt through apertures 20 and 22 extends substantially straight from the deflection fitting to the tongue.

Since the shoulder belt 1b thus extends substantially linearly from the deflection fitting to the tongue after the shoulder belt 1b is inserted into the shoulder belt slit 24b and wound around the wind-up shaft 24, the shoulder belt 1b never applies a lifting force to the child seat 10, thereby stabilizing the attitude of the child seat 10.

In this embodiment, the lap belt slit 24a and the shoulder belt slit 24b are formed to continue in a vertical direction into each other via the common belt inlet 24c. Therefore, even when the lap belt 1a is inserted into the shoulder belt slit 24b, the lap belt 1a moves into the lap belt slit 24a because of the tension by the seat belt retractor. Similarly, even when the shoulder belt 1b is inserted into the lap belt slit 24a, the shoulder belt 1b moves into the shoulder belt slit 24b because of the tension by the seat belt retractor. After that, the lap belt 1a or the shoulder belt 1b can be smoothly wound.

In this embodiment, the knobs 36, 38 are connected to the worm shaft 32 via the torque clutches 50 so that the knobs 36, 38 are adapted to idle after the lap belt 1a or the shoulder belt 1b is wound around the wind-up shaft 24 enough and the preset tension has been applied to the lap belt 1a and the shoulder belt 1b, thereby preventing excessive winding torque from being exerted on the wind-up shaft 24.

Since the torque clutches 50 are installed in the knobs 36, 38, respectively, the operator can easily recognize from vibration and sound generated by idling of the knob 36, 38 that the belt 1a, 1b has been wound to obtain the preset tension.

As the aforementioned embodiment is an example of the present invention, it is to be understood that the invention is not limited to the aforementioned embodiment thereof. For example, the torque limiter for limiting the winding torque may be of a type besides such a type as the torque clutches 50 that physically stops the further winding of the seat belt when the tension on the seat belt reaches the preset value. For instance, a torque sensor (strain gauge) is provided for detecting the winding torque exerted on the wind-up shaft, and an indicator is provided which emits light when the torque detected by the torque sensor reaches to a preset value or a monitor is provided which indicates numerically the torque detected by the torque sensor to let the operator know the completion of the winding of the seat belt. In addition, a means for changing the preset value may be provided.

As described in the above, a child seat according to an embodiment of the present invention can be firmly secured to a vehicle seat even with a shoulder belt of a three-point seat belt.

In addition, with a child seat according an another embodiment of the present invention, the seat belt can be wound up to securely apply a predetermined tension to the seat belt.

The priority documents, Japanese Patent Application No. 2002-299201, filed Oct. 11, 2002, and Provisional Application No. 60/430,439, filed Dec. 3, 2002, are hereby incorporated by reference.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A child seat for a vehicle, comprising:
   a child seat; and
   a shaft attached to the child seat;
   wherein a first end of the shaft is disposed at a higher elevation than a second end of the shaft;
   wherein the shaft is rotatable about an axis of the shaft,
   wherein the shaft includes at least one slit configured to accept a seat belt, and
   wherein the at least one slit includes a lap belt slit configured to accept a lap belt and a shoulder belt slit configured to accept a shoulder belt.

2. The child seat according to claim 1, wherein the shoulder belt slit is disposed above the lap belt slit.

3. The child seat according to claim 1, wherein the shoulder belt slit is disposed adjacent to the lap belt slit.

4. The child seat according claim 1, wherein the shoulder belt slit and the lap belt slit have a common belt inlet.

5. A child seat for a vehicle, comprising:
   a child seat; and
   a shaft attached to the child seat;
   wherein a first end of the shaft is disposed at a higher elevation than a second end of the shaft;
   wherein the shaft is rotatable about an axis of the shaft,
   wherein the shaft includes at least one slit configured to accent a seat belt, and
   wherein the shaft extends in a vertical direction.

6. The child seat according to claim 5, wherein the shaft is configured so that a seat belt inserted into the at least one slit winds around the shaft when the shaft is rotated.

7. A child seat for a vehicle, comprising:
   a child seat; and
   a drive train attached to the child seat;
   wherein the drive train includes a rotatable shaft and a torque limiting device;
   wherein the shaft includes at least one slit configured to accept a seat belt; and
   wherein the torque limiting device is configured to prevent torque exerted on the shaft from exceeding a predetermined value.

8. The child seat according to claim 7, wherein the shaft is configured so that a seat belt inserted into the at least one slit winds around the shaft when the shaft is rotated.

9. The child seat according to claim 7, wherein the torque limiting device comprises a torque clutch.

10. The child seat according to claim 7, wherein the torque limiting device comprises a torque sensor.

11. A child seat according to claim 7, wherein the drive train further comprises a knob configured to enable a user to rotate the shaft.

12. A child seat according to claim 11, wherein the torque limiting device prevents a torque exerted on the knob from being transmitted to the shaft when the torque exerted on the knob exceeds a predetermined value.

13. An attachment mechanism for securing a child seat to a vehicle using a seat belt, comprising:
   a rotatable shaft configured to be installed on a child seat;
   wherein the shaft includes at least one slit configured to accept the seat belt,
   wherein the shalt is configured so that a first end of the shaft is disposed at a higher elevation than a second end of the shaft when the shaft is installed on the child seal, and
   wherein the at least one slit includes a lap belt slit configured to accept a lap belt and a shoulder belt slit configured to accept a shoulder belt.

14. The attachment mechanism for securing a child seat to a vehicle using a seat belt according to claim 13, wherein the shoulder belt slit is disposed adjacent to the lap belt slit.

15. The attachment mechanism for securing a child seat to a vehicle using a seat belt according to claim 13, wherein the shoulder belt slit and the lap belt slit have a common belt inlet.

16. An attachment mechanism for securing a child seat to a vehicle using a seat belt, comprising:
- a rotatable shaft configured to be installed on a child seat; and
- a torque limiting device,
- wherein the torque limiting device is configured to prevent torque exerted on the shaft from exceeding a predetermined value, and
- wherein the shaft includes at least one slit configured to accept the seat belt,
- wherein the shaft is configured so that a first end of the shaft is disposed at a higher elevation than a second end of the shaft when the shaft is installed on the child seat.

17. The attachment mechanism for securing a child seat to a vehicle using a seat belt according to claim 16, wherein the torque limiting device comprises a torque clutch.

18. The attachment mechanism for securing a child seat to a vehicle using a seat belt according to claim 16, wherein the torque limiting device comprises a torque sensor.

19. The attachment mechanism for securing a child seat to a vehicle using a seat belt according to claim 16, further comprising a knob configured to enable a user to rotate the shaft.

20. The attachment mechanism for securing a child seat to a vehicle using a seat belt according to claim 19, wherein the torque limiting device is configured to prevent a torque exerted on the knob from being transmitted to the shaft when the torque exerted on the knob exceeds a predetermined value.

* * * * *